(12) United States Patent
Cummings et al.

(10) Patent No.: US 6,364,296 B1
(45) Date of Patent: Apr. 2, 2002

(54) SHEAR MOUNT

(75) Inventors: Neil Cummings, Manchester, NH (US); Carlos S. Fahroan, Novi, MI (US); Mickey Love, Londonberry, NH (US); Shahram Tousi, Canton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/391,550

(22) Filed: Sep. 8, 1999

Related U.S. Application Data
(60) Provisional application No. 60/109,652, filed on Nov. 24, 1998.

(51) Int. Cl.$^7$ ................................ F16F 5/00; F16F 9/00
(52) U.S. Cl. ...................... 267/141.4; 267/141; 267/153
(58) Field of Search ................................ 267/141, 153, 267/141.4, 141.5, 14.6, 141.2, 141.3

(56) References Cited

U.S. PATENT DOCUMENTS

| | | | |
|---|---|---|---|
| 3,266,139 A | * | 8/1966 | Adams ..................... 267/141.4 |
| 3,338,542 A | * | 8/1967 | Meinhard ................... 267/141 |
| 3,622,194 A | | 11/1971 | Bryk ........................... 267/141 |
| 3,809,427 A | | 5/1974 | Bennett |
| 3,927,730 A | | 12/1975 | Winslow |
| 4,720,075 A | | 1/1988 | Peterson et al. |
| 4,921,203 A | | 5/1990 | Peterson et al. |
| 5,178,433 A | | 1/1993 | Wagner |
| 5,308,048 A | * | 5/1994 | Weaver et al. ............... 267/153 |
| 5,799,930 A | * | 9/1998 | Willett ...................... 267/141.4 |
| 5,941,511 A | * | 8/1999 | Dawda et al. ........... 267/141.4 |

FOREIGN PATENT DOCUMENTS

| | | | | |
|---|---|---|---|---|
| CA | | 615608 | * 2/1961 | ................. 267/153 |

* cited by examiner

*Primary Examiner*—Matthew C. Graham
(74) *Attorney, Agent, or Firm*—A. Michael Tucker; Casimir R. Kiczek

(57) ABSTRACT

A body mount for absorbing compressive and shear forces in a vehicle is disclosed. The body mount includes a retainer member with a radial portion and an axially extending tubular portion. A microcellular bushing has base, a top, and a passageway extending from the top to the base. The axially extending portion of the retainer member is inserted into the passageway of the bushing. An insert is molded into the bushing to form a one-piece member. The insert has an inner diameter. The microcellular cylinder insert is adjacent to the axially extending tubular portion. A microcellular cylinder sleeve is formed between the inner diameter and the tubular portion and in combination with the insert resists lateral forces and does not interfere with the vertical forces from the frame to the body. The microcellular shear mount design provides excellent lateral shake isolation and excellent vertical rate dissipation over prior art rubber shear mounts.

40 Claims, 3 Drawing Sheets

SHEAR MOUNT

CROSS REFERENCE TO RELATED APPLICATION

This application claims priority from U.S. Provisional Patent Application No. 60/109,652, filed Nov. 24, 1998.

BACKGROUND OF THE INVENTION

Vehicle shear mounts are used extensively in body on frame vehicles. Most commonly they are used in trucks and sport utility vehicles to isolate the vertical vibration transmitted from the frame to the body as well as to provide good lateral shake control. A shear mount is located between the body and the frame of the vehicle to provide isolation of lateral and vertical forces. A shear mount or upper mount and a body mount work in conjunction with each other to isolate vertical forces and both are used to improve vehicle ride and handling characteristics. The shear mount or upper mount provides an additional mechanical vibration isolation function for lateral shake control. Depending on the size of the vehicle, there are as many as six combination body and shear mounts used in pairs on opposite sides of the frame.

A typical body or shear mount system is made up of two isolation assemblies: an upper mount and a lower mount. The frame is sandwiched between the upper and lower mount and the vehicle body rests on top of the upper mount. A fastener connects the body to the lower mount, and with further insertion, the fastener attaches the body to the frame sometimes in conjunction with a cage nut. As the frame moves up and down, it vertically pushes against the upper and lower mounts and as the frame moves side to side, it laterally pushes against the upper mount. Vertical stiffness determines the ride control characteristics of a vehicle while lateral stiffness determines the control of the vehicle.

As stated previously, the upper mount or shear mount is typically designed to provide an additional function, namely lateral shake control. Traditionally, solid rubber has been used as a vibration isolation material in designing shear mounts. However, a solid rubber shear mount has several inherent design limitations. First, the design employs three mechanical components. Next, its performance characteristics are limited by the inherent properties of rubber which are excellent in the compressive mode but weak in shear or lateral mode. Finally, a traditional design upper mount utilizes a shear cap component which by design limits the response of the shear mount to compressive forces only. The rubber member in the shear mount portion of the design must be of a relatively high durometer value or hardness to provide sufficient lateral stiffness. However, a high durometer rubber material does not lend itself to good ride and handling characteristics because high durometer rubber material results in high vertical stiffness. Thus, the rubber shear mount inherently has a low lateral rate to vertical rate response ratio. This especially negatively impacts the operator's response to a vehicle's drive characteristics subjected to high vertical and lateral shake conditions such as in the case of sport utility vehicles. Additionally, the rubber shear mount lacks sufficient elastomeric properties for good isolation of the vibration transmitted from the frame to the body and is unable to provide good lateral shake control desired for sport utility vehicles.

SUMMARY OF THE INVENTION

The present invention provides a body mount for absorbing lateral and vertical vibration from the frame to the body in a vehicle. The shear mount includes an isolator with a base portion, a top portion and a passageway extending from the base portion to the top portion. An insert is located adjacent to the base portion. The insert has a flanged portion and a cylindrical portion extending from the flanged portion. The flanged portion of the insert is encapsulated by overmolding with the cross-linked elastomeric material of the isolator. The isolator and the insert form a one-piece member. A retainer member is located adjacent to the top portion of the isolator. The retainer has a radial portion and an axially extending portion through the passageway in this isolator.

The object of the present invention is to provide a mount which provides both good lateral and vertical stiffness.

Still another object is to provide a mount that is less complex, less expensive to manufacture and weighs less than current known mounts of similar design.

These and other objects and features of the invention will become apparent from the description and especially taken in conjunction with the accompanying drawings illustrating the invention and one embodiment.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

As used herein, lateral shake means side to side movement or movement which is transverse of the axis of a mount and vertical shake means up and down movement or movement which is along the axial axis of a mount. Lateral shake stiffness is the displacement of a mount in the lateral shake direction divided by unit load. Vertical shake stiffness is the displacement of a mount in the vertical shake direction divided by unit load.

Figures 1, 2:
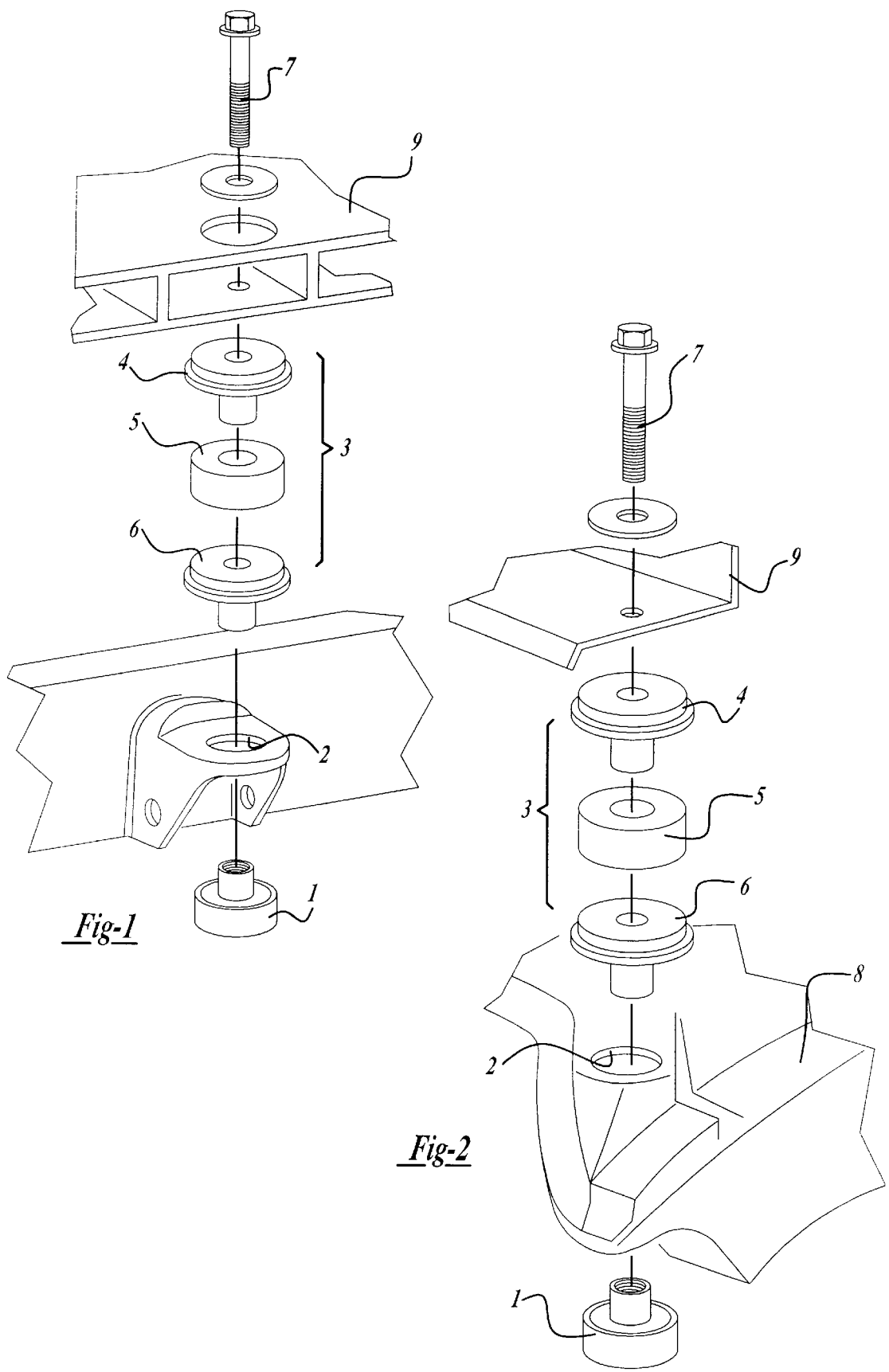
FIG. 1 is an exploded view of a rubber upper and lower body mount between a body and a frame and connected together with a fastener.
FIG. 2 is another exploded view of a rubber upper and lower body mount between a body and a frame and connected together with a fastener.

As shown in FIGS. 1 and 2, vehicles are presently designed to use a lower rubber body mount 1 which includes a generally cylindrical rubber member 1A in combination with an upper rubber shear mount 3 to isolate lateral shake and vertical shake forces from the frame 8 to the body 9 in three to six locations depending on the size of the vehicle. The rubber shear mount 3 includes a metal retainer or cap with a peripheral lip 4, a generally cylindrical rubber member 5 and a shear cap element 6. The shear cap 6 is generally rubber coated to reduce metal to metal contact and has a peripheral lip. The lip of the cap 4 and the lip of the cap 6 function to contain the rubber member 5 between them. The upper rubber shear mount 3, the lower rubber mount 1, the body 9 and frame 8 are fastened together through an aperture 2 in the frame 8 by means of a conventional fastener 7. The aperture 2 has a pair of flats 2A formed therein for the purpose of orienting the shear mount 3 in the aperture. The lower rubber mount 1 is located below the frame 8 and the upper rubber shear mount 3 is located between the body 9 and the frame 8. As the frame moves, it imparts vertical (up and down) forces onto the lower body mount and upper shear mount 3 and lateral (side to side) forces onto the lower body mount 1. Typically, the rubber member 5 is made of a solid elastomeric material with a material hardness in the range of 40 to 80 shore A to provide sufficient lateral stiffness to absorb the lateral forces from the frame 8 to the body 9. However, since the solid elastomeric material is generally very stiff, it does not isolate vertical forces from the frame 8 to the body 9 very effectively. A shear cap member 6 is provided to enhance the life of the rubber member 5 by preventing extrusion of the rubber material under high vertical compressive loads by containing the rubber element and limiting the vertical travel of the rubber in the compressive load mode. As a result, the rubber shear mount 3 has a ratio of lateral stiffness rate response to vertical stiffness rate response which is low. Thus, good ride and handling of a vehicle are compromised because of the stiffness properties of the solid elastomeric material. This is the current state of the art as related to conventional rubber shear mounts. FIG. 1 shows a typical example of a mount in an outboard frame style bracket and FIG. 2 shows a mount in a typical cross member style bracket.

Figure 3:
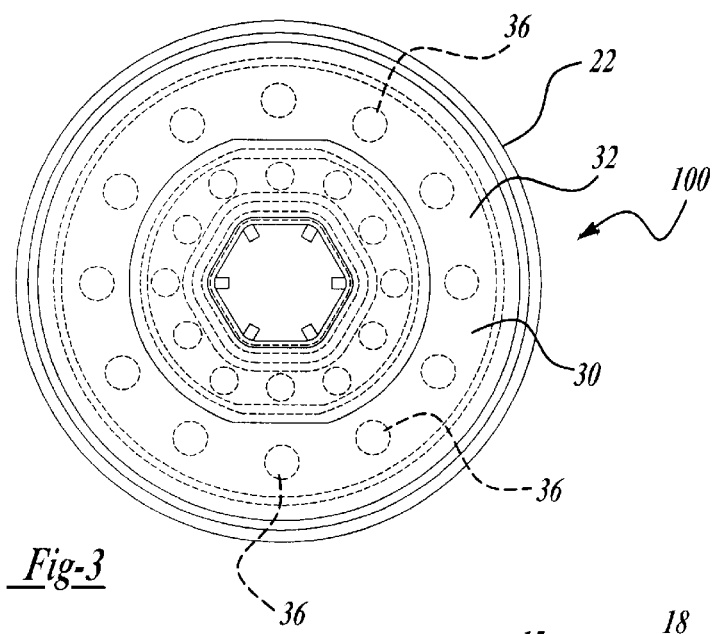
FIG. 3 is a bottom view of the shear mount according to the present invention.
Figure 4:
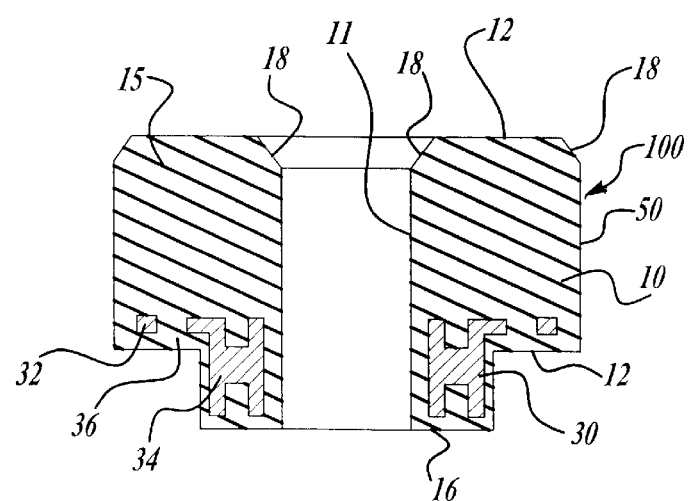
FIG. 4 is a cross-sectional view of a one-piece member according to the invention.
Figure 5:
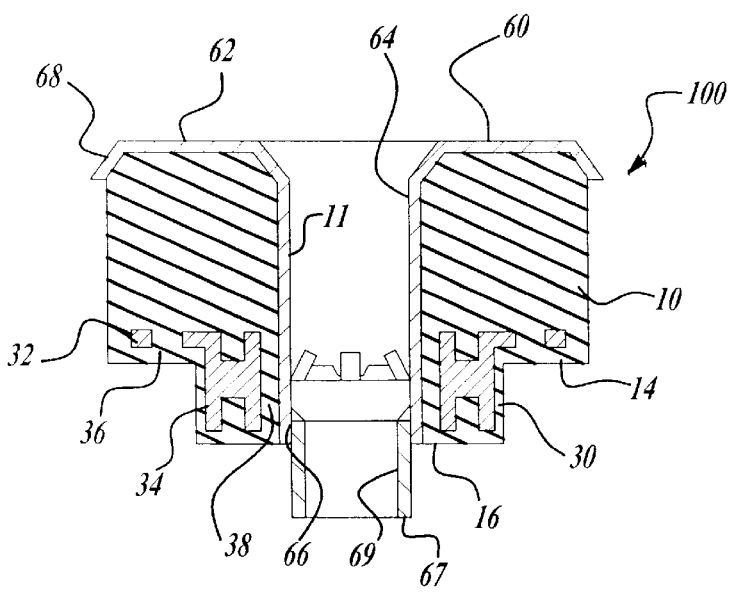
FIG. 5 is a cross-sectional view of FIG. 3.

The upper shear mount according to the present invention is designated by the numeral 100 and includes a bushing or isolator member 10, an insert member 30, a retainer member 60, and an insertion member 70, as shown in FIGS. 3–5.

The bushing or isolator member 10 is made of an elastomeric material such as a foamed microcellular polyurethane material (MCU) or the like which can be cast or molded or processed by means well known in the prior art. Preferably, the bushing is cast for a purpose to be described later on herein. The bushing or isolator 10 is preferably cylindrical in shape. The bushing body portion 15 has a base portion 12 having an axial cylindrical protrusion 16. The top of the base portion 14 is generally flat but a pair of chamfers 18 are formed on the inside diameter and outside diameter of the bushing body portion 15. The height and diameter or width of the bushing body portion 15 are determined by the specific vehicle application requirements. The preferred ratio of the diameter to height is between 1.4 to 1.8 although the range may extend from 0.50 to 10.0. Between the top surface 12 and the bottom surface 14, an axial passageway 11 is formed in the bushing or isolator body 15 for a purpose to be described later on. Those skilled in the art will recognize that the isolator body 15 may optionally be made of other geometric shapes including a truncated cone with convolute ribs cylindrical with convolute ribs, rectangular, or other shapes known in the art or as dictated by the application's isolation requirements. The isolator body's height as well as the amount of pre-compression on the elastomeric member effects the vertical stiffness and rate significantly. The higher the amount of pre-compression on the bushing body 15, the higher will be the vertical stiffness of the body 15. Also, the lower the height of the isolator, the higher the vertical stiffness rate. The preferred vertical stiffness rate is between 350 N/mm to 1500 N/mm, although the range may extend from 150 N/mm to 3500 N/mm.

As stated earlier, the isolator body 15 is preferably made of MCU. Alternatively, other suitable foamed elastomers may be used in practicing the invention. Microcellular polyurethane is a polymer product obtained from the interaction of diisocyanate glycol and a blowing agent. The glycol is usually a polyol which can be of either the polyester or polyether type. Polyester types and polyether types generally have hydroxyl groups that are free to react with isocyanate. The polyesters are low-molecular weight macroglycols.

The isocyanate also reacts with water to produce carbon dioxide gas for foaming. Foam density is determined by the quantity of water present in the formulation and is characterized by the weight of the polyurethane material divided by the overall volume.

Once intimately mixed, the ingredients are discharged from the mixer and deposited into a mold where complex chemical reactions take place.

Figure 6:
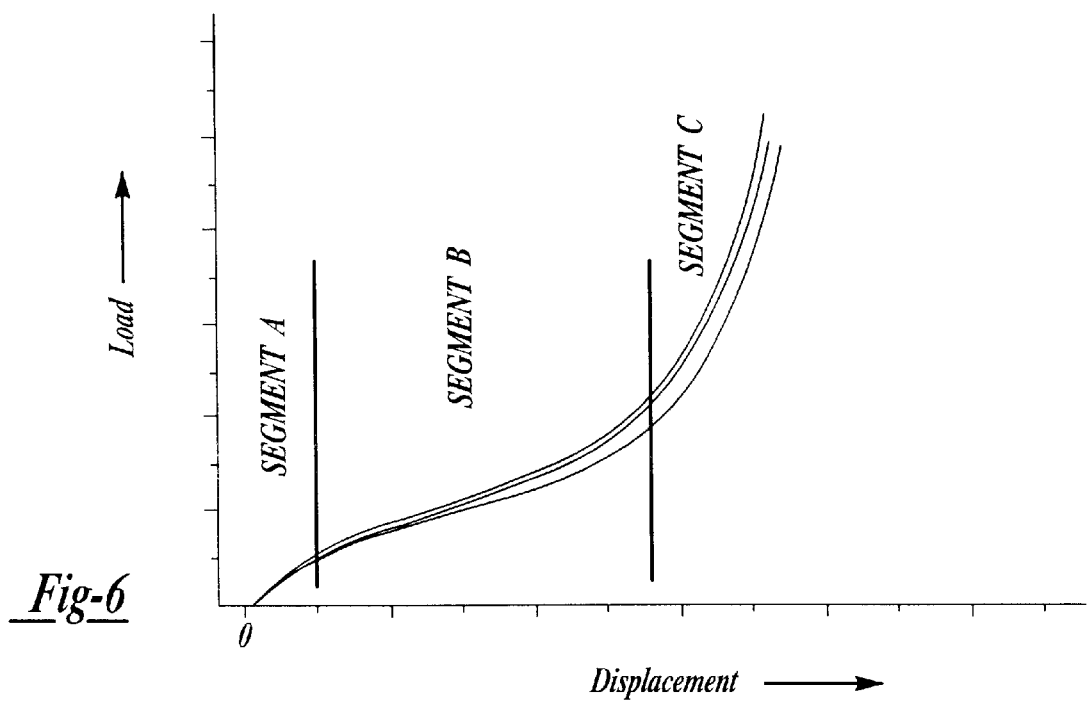
FIG. 6 is a typical load versus displacement curve for microcellular polyurethane.

The reactions are primarily exo-thermic which converts the liquid into a foam. This technology is known in the prior art. See *Rubber Technology, Third Edition*, edited by Maurice Morton-Van Norstand Reinhold, ISBN 0-442-2642204, pages 555–560, which is incorporated by reference herein. The damping characteristics of a microcellular polyurethane foam are adjusted by the amount of gases trapped in the body of the polyurethane. Thus, the stiffness, and the vibration characteristics of the microcellular polyurethane can be adjusted by varying MCU density to meet specific application requirements. Microcellular polyurethane foam density varies from 0.3 to 0.8 grams per cubic centimeter. Preferably, the range of density is 0.4 to 0.7 grams per cubic centimeter. A typical load versus displacement curve for microcellular polyurethane isolators is shown in FIG. 6. The typical characteristics of MCU elastomers as compared to solid rubber are primarily influenced by the microcellular structure of the material and not by the chemical backbone or primary polymeric material.

Key design parameters that effect vertical shake stiffness are the material elastic modulus, non-linear material property of the material, geometric parameters such as diameter of cylinder, the height of the cylinder, and the inside diameter of the cylinder. More importantly, the interference fit of the isolator 10 against the metal retainer has a significant influence on the vertical shake stiffness.

Relating back to FIGS. 3–5, the insert member 30 is formed with a perforated flange section 32 and an axial, cylindrical section 34 extending from the flange section 32. The axial or cylindrical section 34 has a plurality of apertures 36 circumferentially spaced and formed in the cylindrical section. Those skilled in the art will recognize that the apertures 36 may be round, elliptical, triangular, polygonal or a similar suitable shape, that captures the microcellular material so that the microcellular material can flow into the aperture as will be discussed later on herein. The insert is preferably made of a polymeric material such as thermoplastic material including nylon 6,6 with glass fiber for reinforcement although other reinforced thermoplastic or thermoset resinous materials, such as glass filled polyester, glass filled vinyl ester, Stanyl® which is a trademark of DSM Corporation, and polyolefin and other high strength polymers, as well as metals such as steel, aluminum or magnesium are also suitable in practicing the invention. The insert 30 may be molded or formed from separate components.

When thoisolator 10 is formed, the insert member 30 is placed into the mold and the microcellular polyurethane material is introduced into the mold. The insert member 30 is preferably oriented in the mold with the perforated flanged section 32 spaced away from the base portion of the isolator.

Alternatively, the insert 30 may be placed adjacent to the molded MCU and bonded to the MCU by conventional adhesives, as is well known in the prior art As stated previously, the axial or cylindrical section 34 is oriented such that it extends away from the base portion 14. As the microcellular polyurethane material is introduced into the mold, preferably by casting, the material flows in through the perforated flange and the plurality of apertures 36 in the insert member 30. When the chemical reaction of the polyurethane material is complete, the part is removed from the mold. The mount may also be formed by injection molding the microcellular polyurethane material into the mold. Thus, the insert member 30 is partially encapsulated in the isolator 10 so as to form a one-piece member 50. The axial cylindrical protrusion 16 of the isolator 10 is formed between the passageway 11 and inner diameter 38 of the axial, cylindrical section 34 of the insert member 30.

As discussed earlier, the microcellular polyurethane material can be formulated to provide varying vertical stiffness by varying the compressive load on the bushing 10. This is because the microcellular structure has an ability to collapse on itself and squeeze out any gases in the micro cellular cavities formed by the foaming process. As the applied vertical load increases, the microcellular material which is initially soft becomes gradually stiffer and stiffer. The compression characteristics of the isolator 10 can also be modified by changing its outer geometric shape and the density of the microcellular polyurethane foam.

The lateral forces on the mount which are generated by a vehicle can be high and thus an isolator 10 must have high lateral stiffness. A key factor in making an effective shear mount is to increase the ratio of the lateral stiffness rate to vertical stiffness rate ratio beyond a value of 1.0. This is because better ride and lateral shake characteristics are obtained with higher ratios of lateral stiffness rate to vertical stiffness rate of a vehicle.

A microcellular polyurethane shear mount provides for a much higher lateral to vertical stiffness rate ratio than rubber mounts due to the inherent micro-structure nature of the microcellular polyurethane, the high stiffness of the insert member, and the isolation properties of the microcellular polyurethane. Additionally, the microcellular polyurethane material has excellent durability characteristics and it has a low compression set, both of which are desired properties for body or shear mount applications. As stated previously, the microcellular polyurethane construction has a microcellular structure which includes cell units filled with gases such as air. Once the microcellular polyurethane is compressed, the cell structures tend to collapse and push the air out of the cells. This material behavior results in a more gradual absorption of sudden load changes, hence a more gradual load absorption, as shown in FIG. 6.

As the load on the mount increases from a no-load condition, the stiffness increases as shown in Segment A in FIG. 6. With further increases in load, the stiffness flattens as shown in Segment B. This is the "soft" segment where the microcellular cells of the MCU begin to collapse upon themselves. As the load increases even further and the cells are substantially collapsed upon themselves, the stiffness increases as shown in Segment C. Those skilled in the art will recognize that the curve shown in FIG. 6 is representative of the general stiffness response to load and displacement for MCU material with an MCU density of 0.3 to 0.8 grams per cubic centimeter.

The material property of the insert 30 is another important factor in designing a shear mount with the desired lateral shake control. The insert 30 is embedded inside the microcellular polyurethane body 15 to provide enhanced lateral support for the microcellular polyurethane material but it does not interfere with the ride vertical stiffness. The geometric shape and material stiffness property of the insert 30 also influence the lateral stiffness curve of the shear mount.

Returning to FIGS. 3–5, the microcellular polyurethane shear mount is made from a one-piece microcellular polyurethane construction 50 with an axial axis 52 with a glass filled insert 30 which helps to provide further lateral stiffness to the body. There is no need for the shear cap element since sufficient lateral stiffness is provided by the insert 30 in combination with the microcellular axial cylindrical protrusion 16. The microcellular polyurethane shear mount not only provides superior lateral shake characteristics but provides superior performance relative to a conventional solid rubber shear mount in vertical vehicle ride feel. The microcellular polyurethane shear mount also has good resistance to such fluids as oil and gasoline. The MCU shear mount can also be designed for significant weight reduction compared to a similar conventional solid rubber shear mount. Additionally, the MCU mount provides better vibration isolation and noise, vibration and harshness (NVH) than solid rubber mounts. Because the vertical stiffness and lateral stiffness of the microcellular polyurethane can be varied independently of each other by material formulation, density and geometry of the isolator member 10, there is no compromise between high lateral stiffness and vertical stiffness rates and superior NVH characteristics in order to meet the desired vehicle ride characteristics.

The retainer member 60 has a generally radially extending top portion 62 and an axially extending portion 66 extending from the top portion 62. The top portion has a tapered lip at its outer diameter. The axially extending portion 66 has an outer diameter 64 which extends from the top portion 62 to an end 67. The axially extending portion 66 of the retainer 60 at the end 67 has a slightly smaller inner diameter 69 than the inner diameter 64. This slightly smaller inner diameter 67 fits into the corresponding inner diameter of a lower or body mount to assure a tight fit between the shear mount 100 and the lower body mount 1 when the two mounts are fastened together. This prevents any shifting of the shear mount relative to the lower body mount during vehicle operation.

As shown in FIG. 3, the retainer member 60 has an anti-rotation feature 65 which nests into the tube 72 of the insertion member 70. The anti-rotation feature 65 may be polygonal, square, triangular or an elliptical shape with flat spots and with corresponding surfaces in the insertion member 70, as is well known in the shear mount prior art. The insertion member 70 also has a protrusion member 74 which is a plurality of radially inwardly disposed flanges which grip onto the shank of a fastener 7. The insertion member 70 also has an internal threaded portion (not shown) to engage the fastener 7. The insertion member 70 and the retainer member 60 are clamped together by fastener 7. In between the insertion member 70 and the retainer member 60 is sandwiched the upper shear mount 100, the chassis 8 and the lower body mount 1.

The end 67 of the axially extending portion, the microcellular axial cylindrical protrusion 16 and the axial or cylindrical section 34 of the one piece member 50 are inserted into the aperture 2 in the frame 8 of the vehicle. The body 9 is located adjacent to the top 62 of the retainer member 60. A lower body mount 1 is placed adjacent to the aperture 2 in the frame 8 so that the upper mount 100 is nested tightly on the top of the lower body mount 1. A conventional threaded fastener 7 of suitable length is inserted in a hole in the body 9 through the passage in the upper shear mount 100 through the aperture 2 in the frame 8 and then through a hole in the bottom or lower mount and a conventional threaded nut is threaded onto the fastener 7 to join the respective components together. The lateral forces from the frame 8 are transmitted at the aperture 2 to the upper shear mount 100. The fit of the microcellular axial cylindrical protrusion 16 in the aperture 2 is critical to the ability of the shear mount 100 to absorb lateral forces as is the thickness of the microcellular protrusion 16 and its fit over the axial extending portion 66. Preferably, there is a slight interference fit between the extending portion 66 and the protrusion 16. The axial section 34 of the insert 30 acts as a lateral support for the protrusion 16 during lateral force transmission. Thus, the microcellular material density, thickness, the shape and stiffness of the axial section 34 of the insert and the fit of shear mount 100 in the aperture 2 will affect the ability of the shear mount 100 to absorb lateral forces transmitted through the frame 8, isolate the lateral forces from the body 9, and the lateral stiffness of the mount. To reduce the possibility of metal to metal contact, which induces high vibration and noise transmission levels, it is important that the metal retainer and the frame contact only the vibration isolating material, in this case the microcellular polyurethane. Thus, as previously stated the insert 30 is preferably fully encapsulated around both the inside diameter and the outside diameter of the axial section 34 and the insert 30. To provide additional lateral stiffness to the microcellular material without compromising the MCU's vibration isolation characteristics, the insert 30 is encapsulated inside the vibration isolating material. The ratio of insert material thickness to the vibration isolating material thickness influences the lateral stiffness value. The material characteristics and amount of reinforcement used in the insert 30 also influences the lateral stiffness value of the mount. The preferred ratio of thermoplastic thickness of the insert 30 to the MCU thickness is between 0.27 to 1.33 although the range may be from 0.1 to 6.0. The typical lateral stiffness rate associated with the above range is between 100 N/mm to 2000 N/mm. The vertical forces from the frame 8 to the body are absorbed by the lower mount 1 and the shear mount 100. Those skilled in the art will recognize that a shear mount 100 can also be used as a lower body mount.

An additional feature of the shear mount 100 is that the imbedded insert 30 acts as an anti-rotation stop member when the mount 100 is installed in a vehicle. The aperture 2 in the frame 8 has two flats 2A which are preferably oriented in the direction of vehicle lateral movement. In the fore and aft direction, the aperture 2 is round. The axial section 34 of the insert 30 also has corresponding flats 2A molded on its outer diameter. The flats on the insert 30 correspond to the flats 2A in the aperture 2 in the frame so that the shear mount 100 is prevented from rotating when the fastener 7 is tightened during assembly to the frame and body. Additionally, the flats 2A assure that the shear mount 100 is properly oriented in the frame so that the desired lateral control of the mount 100 is assured.

As stated previously, the insert 30 need not be overmolded in the body portion of the elastomer. The insert 30 may be inserted into the body portion after molding of the body portion so long as the body is restrained from rotating relative to the insert 30, as for example, by one or more axially extending fingers from the flange of the insert which penetrates the body portion of the mount to prevent rotation of the bushing member and the insert member 30 during assembly of the shear mount 100 to the frame and body. Alternatively, the mount may be prevented from rotation by interference fit such as by friction member between the body portion and the insert member 30 or by an "o-ring" frictional engagement of the bushing member 10 and the insert member 30.

While the invention has been described in connection with a preferred embodiment, it will be understood that it is not intended to limit the invention to that embodiment only. On the contrary, it is intended to cover all alternative modifications and equivalents that may be included within the spirit and scope of the invention as defined by the appended claims.

We claim:

1. A body mount for absorbing lateral and vertical motion in a vehicle, said body mount comprising:
    a bushing having a base portion, a top portion, and a passageway extending from said base portion to said top portion;
    an insert adjacent to said base portion, said insert having a perforated flanged portion with apertures and a cylindrical portion extending from the flanged portion, said flanged portion of said insert being encapsulated in said bushing by overmolding said insert during molding of said bushing to form a one-piece member, wherein material of the bushing flows through the apertures of the perforated flanged portion; and
    a retainer member, adjacent to said top portion, having a top radial portion and an axially extending portion inserted through said passageway in said one-piece member.

2. A body mount as claimed in claim 1 wherein said bushing is made of foamed microcellular polyurethane.

3. A body mount as claimed in claim 1 wherein said bushing is a cylindrical member.

4. A body mount as claimed in claim 1 wherein said bushing is a truncated cone member.

5. A body mount as claimed in claim 1 wherein said bushing further having a height between said base portion and said top portion and said base portion having a diameter, said diameter to height having a ratio of 0.50 to 10.0.

6. A body mount as claimed in claim 2 wherein said foamed microcellular polyurethane having a density of between 0.3 to 0.8 grams per cubic centimeter.

7. A body mount as claimed in claim 2 wherein said foamed microcellular polyurethane has a density of 0.3 to 0.8 grams per cubic centimeter.

8. A body mount as claimed in claim 4 wherein said truncated cone having at least one convoluted rib.

9. A body mount as claimed in claim 5 wherein said diameter to height ratio varies between 1.4 to 1.8.

10. A body mount as claimed in claim 5 wherein said diameter to height is 1.6.

11. A body mount as claimed in claim 5 wherein said bushing having a lateral stiffness rate and a vertical stiffness rate, said lateral to vertical stiffness ratio is at least 1.0.

12. A body mount for absorbing vertical and lateral motion in a vehicle, said vehicle having a frame and a body spaced apart from each other, said body mount comprising:
    a retainer adjacent to the body, said retainer having a radial portion and a tubular portion extending axially from said radial portion;
    a bushing, formed from microcellular polyurethane, having a base portion, a top portion, and a passageway extending from said top portion to said base portion, said tubular portion of said retainer extending through said passageway; and an insert embedded into said base portion of said bushing to form a one-piece member, said insert formed from a thermoplastic material and including a perforated flange with apertures, wherein the microcellular polyurethane of said bushing encapsulates said perforated flange and fills said apertures; and body a fastener connecting said retainer and said one-piece member to said frame and said body.

13. A body mount as claimed in claim 12 wherein said bushing has a density between 0.3 and 0.8 grams per cubic centimeter.

14. A body mount as claimed in claim 12 wherein said insert is formed from nylon.

15. A body mount as claimed in claim 12 wherein said bushing has a lateral stiffness rate and a vertical stiffness rate, said lateral stiffness rate is equal to said vertical stiffness rate.

16. A body mount as claimed in claim 15 wherein the ratio of said lateral stiffness rate to said vertical stiffness rate is greater than 1.0.

17. A body mount for absorbing compression and shear forces in a vehicle, said body mount comprising:

retainer member having a radial portion and an axially extending tubular portion;

a microcellular bushing adjacent to said retainer member, said bushing having a base, a top, and a passageway extending from said base to said top; said tubular portion of said retainer member disposed in said passageway; and an insert adjacent to said base, said insert including a perforated flanged portion with apertures that is encapsulated by said bushing to form a one-piece member.

18. A body mount as claimed in claim 17 wherein said tubular portion of said retainer member includes an anti-rotation feature.

19. A body mount as claimed in claim 17 wherein said base having an outer diameter and said passageway having a height, said outer diameter to said height having a ratio of 0.5 to 10.0.

20. A body mount as claimed in claim 17 wherein said insert having at least one aperture.

21. A body mount as claimed in claim 17 wherein said bushing having a lateral stiffness rate and a vertical stiffness rate, said lateral stiffness rate at least equal to said vertical stiffness rate.

22. A body mount as claimed in claim 17 wherein said insert is made of a plastic material.

23. A body mount as claimed in claim 17 wherein said retainer member receives an insertion member having radially disposed flanges.

24. A body mount as claimed in claim 17 wherein said microcellular bushing having a soft segment where the cells collapse upon themselves.

25. A body mount as claimed in claim 17 wherein said microcellular bushing further having a thickness and said retainer further having a thickness, whereby the ratio of said retainer thickness to said thickness of said microcellular bushing ranges form 0.1 to 6.0.

26. A body unit as claimed in claim 17 wherein said microcellular bushing further having a thickness and said retainer further having a thickness, whereby the ratio of said retainer thickness to said thickness of said microcellular bushing ranges form 0.27 to 1.33.

27. A body mount as claimed in claim 17 wherein said microcellular bushing further having a vertical stiffness rate between 150 n/mm to 3500 n/mm.

28. A body mount as claimed in claim 17 wherein said microcellular bushing further having a vertical stiffness rate between 350 n/mm to 1500 n/mm.

29. A body mount as claimed in claim 17 wherein said microcellular bushing further having a lateral stiffness rate between 100 n/mm to 2000 n/mm.

30. A body mount as claimed in claim 19 wherein said outer diameter to said height having a ratio of 1.4 to 1.8.

31. A body mount for absorbing lateral motion vertical motion between a frame and a body, said body mount comprising:

a first bushing member, formed from microcellular polyurethane, having a top portion, a base portion, an axially extending portion from said base portion, and a passageway extending from said top portion to said axially extending portion;

an insert adjacent to said first bushing member, said insert having a flanged section, an axially extending section from said flanged section, and a plurality of apertures in said flanged section, said flanged section being encapsulated in said first bushing member, wherein microcellular polyurethane of said first bushing member fills said apertures of said flanged section, said flanged section adjacent to said base portion, said axially extending section of said insert adjacent to said axially extending portion of said first bushing member and in spaced apart relation to said passageway; and a second bushing member adjacent to said first bushing member;

whereby lateral motion is controlled by said axially extending portion of said first bushing member and said axially extending portion of said insert between the body and the frame and vertical motion is controlled by said first bushing member and said second bushing member.

32. A body mount as claimed in claim 31 wherein the ratio of said axially extending portion of said insert divided by said axially extending portion of said first bushing member is between 0.1 to 6.0.

33. A body mount as claimed in claim 31 wherein the ratio of the outer diameter of the bushing member to height of the bushing member is between 0.5 to 10.0.

34. A body mount as claimed in claim 31 wherein said axial extending section of said insert having a plurality of apertures, said insert being encapsulated in microcellular polyurethane material.

35. A body mount as claimed in claim 31 wherein said first bushing member having an outer peripheral surface, said peripheral surface having convolute ribs.

36. A body mount as claimed in claim 31 wherein said apertures having shapes selected from round, elliptical, triangular, and polygonal.

37. A body mount as claimed in claim 31 wherein said second bushing member is made from rubber material, said rubber material having a hardness in the range of 40 to 80 Shore A.

38. A body mount as claimed in claim 31 wherein said microcellular bushing member has a density between 0.3 to 0.8 grams per cubic centimeter.

39. A body mount as claimed in claim 31 wherein said first bushing member and said second bushing member having a vertical stiffness ratio.

40. A body mount as claimed in claim 39 wherein said first bushing member having a lateral stiffness ratio and wherein the ratio of said lateral stiffness ratio to said vertical stiffness ratio is greater than 1.0.

* * * * *